(12) United States Patent
Naeemi et al.

(10) Patent No.: US 9,623,393 B2
(45) Date of Patent: Apr. 18, 2017

(54) DEHYDROGENATION OF CYCLIC THIOETHERS

(75) Inventors: Esmaeel Naeemi, Lynnwood, WA (US);
Mangesh Bore, Redmond, WA (US);
David G. O'Connor, North Bend, WA (US); Robert B. Nelson, Snoqualmie, WA (US)

(73) Assignee: ASEMBLON, INC., Redmond, WA (US)

( * ) Notice: Subject to any disclaimer, the term of this patent is extended or adjusted under 35 U.S.C. 154(b) by 1586 days.

(21) Appl. No.: 12/610,322

(22) Filed: Nov. 1, 2009

(65) Prior Publication Data

US 2011/0020214 A1    Jan. 27, 2011

Related U.S. Application Data

(60) Provisional application No. 61/110,288, filed on Oct. 31, 2008, provisional application No. 61/110,277, filed on Oct. 31, 2008.

(51) Int. Cl.
  *B01J 19/00*    (2006.01)
  *C01B 3/22*    (2006.01)
  (Continued)

(52) U.S. Cl.
  CPC ......... *B01J 12/007* (2013.01); *B01J 19/2485* (2013.01); *B01J 23/42* (2013.01);
  (Continued)

(58) Field of Classification Search
  None
  See application file for complete search history.

(56) References Cited

U.S. PATENT DOCUMENTS 3,857,859 A * 12/1974 Tumolo .................. 549/505
5,166,362 A * 11/1992 Forquy et al. ............ 549/83
(Continued)

FOREIGN PATENT DOCUMENTS

DE        2062587 A  *  8/1974
SU        1490120 A  *  6/1989

OTHER PUBLICATIONS

DE 2062587 A Derwent English Abstract, Aug. 12, 1974.*
SU 1490120 A Derwent English Abstract, Jun. 30, 1989, Manuilova et al.*

*Primary Examiner* — Colin W Slifka
(74) *Attorney, Agent, or Firm* — Olympic Patent Works PLLC

(57) ABSTRACT

There is disclosed a surprising reaction of an alkane thiol with a catalyst and heat to become dehydrogenated and form a thiophene rather than an expected desulfurization reaction to form the corresponding alkane or alkene. Moreover, there are disclosed surprising results regarding the form of a catalyst to allow a reaction of an alkane thiol to form the dehydrogenated thiophene at lower temperatures and at higher conversion percentages to allow for more efficient recovery of thiophenes to allow for recycling and reuse of thiophenes to hydrogenate to form alkane thiols. Further still, there is disclosed a set of reaction conditions and catalyst presentation that allows for recovery of usable diatomic hydrogen gas from a dehydrogenation reaction of substituted or unsubstituted cyclic thioethers to substituted or unsubstituted thiophene.

4 Claims, 9 Drawing Sheets

(51) Int. Cl.
- B01J 12/00 (2006.01)
- B01J 19/24 (2006.01)
- B01J 23/42 (2006.01)
- B01J 23/44 (2006.01)
- B01J 23/46 (2006.01)
- B01J 23/50 (2006.01)
- B01J 23/52 (2006.01)
- B01J 37/02 (2006.01)
- B01J 21/04 (2006.01)
- B01J 21/06 (2006.01)
- B01J 21/08 (2006.01)
- B01J 21/18 (2006.01)

(52) U.S. Cl.
CPC ............ *B01J 23/44* (2013.01); *B01J 23/464* (2013.01); *B01J 23/50* (2013.01); *B01J 23/52* (2013.01); *B01J 37/0201* (2013.01); *C01B 3/22* (2013.01); *B01J 21/04* (2013.01); *B01J 21/063* (2013.01); *B01J 21/08* (2013.01); *B01J 21/18* (2013.01); *B01J 2219/00006* (2013.01); *B01J 2219/00063* (2013.01); *B01J 2219/00094* (2013.01); *B01J 2219/00117* (2013.01); *B01J 2219/00155* (2013.01); *C01B 2203/0277* (2013.01); *C01B 2203/04* (2013.01); *C01B 2203/048* (2013.01); *C01B 2203/107* (2013.01); *C01B 2203/1023* (2013.01); *C01B 2203/1041* (2013.01); *C01B 2203/1064* (2013.01); *C01B 2203/1082* (2013.01); *C01B 2203/1217* (2013.01); *C01B 2203/1288* (2013.01); *C01B 2203/148* (2013.01); *C01B 2203/169* (2013.01); *C01B 2203/1619* (2013.01); *C01B 2203/1623* (2013.01)

(56) References Cited

U.S. PATENT DOCUMENTS

| | | | |
|---|---|---|---|
| 6,616,909 B1* | 9/2003 | Tonkovich et al. | 423/648.1 |
| 6,802,875 B1* | 10/2004 | Kimbara et al. | 48/61 |
| 7,074,375 B2* | 7/2006 | Lampert et al. | 423/244.09 |
| 7,186,396 B2* | 3/2007 | Ratner et al. | 423/648.1 |
| 2003/0180216 A1* | 9/2003 | TeGrotenhuis et al. | 423/659 |
| 2005/0119515 A1* | 6/2005 | Machhammer et al. | 585/658 |
| 2006/0143981 A1* | 7/2006 | Toseland et al. | 48/61 |

\* cited by examiner

DEHYDROGENATION OF CYCLIC THIOETHERS

CROSS-REFERENCE TO RELATED APPLICATION

This patent application claims priority to U.S. Provisional Patent Applications 61/110,288 and 61/110,277, both filed on 31 Oct. 2008.

TECHNICAL FIELD

The present disclosure provides a surprising mechanism for the storage of hydrogen in a liquid, organic carrier. This mechanism arises from the reaction of an alkane thiol with a catalyst and heat to become dehydrogenated and form a thiophene with a hetero sulfur atom rather than a desulfurization reaction to form the corresponding alkane or alkene. The hydrogen, first stored in the alkane thiol, is released from this dehydrogenation and could be used as fuel, while the remaining thiophene could store hydrogen once again by being rehydrogenated. Moreover, the present disclosure provides surprising results regarding the form of identifying a catalyst to convert a ring substituted or unsubstituted tetrahydrothiophene to its corresponding thiophene at relatively high yields and low reaction temperatures. Further still, the present disclosure provides a set of reaction conditions and catalyst presentation that allows for recovery of usable hydrogen from a dehydrogenation reaction of substituted or unsubstituted tetrahydrothiophene and other cyclic thioethers to substituted or unsubstituted thiophene.

BACKGROUND

Hydrogen has been suggested as an ecologically clean energy carrier because it does not produce air pollution or the greenhouse gases carbon dioxide, carbon monoxide or methane. Hydrogen has almost three times the energy content of gasoline based on weight, but only about a quarter based on volume (Satyapal et al., *Catal. Today* 120:246-256, 2007). Lower-cost, lighter-weight and higher-density hydrogen storage is one of the key requirements for hydrogen energy use. The US Department of Energy (DOE) has set technology targets for hydrogen storage for 2010 and 2015. It is desired by 2010 to develop hydrogen storage systems achieving a gravimetric density of 2 kWh/kg (6 wt. %), a volumetric density of 1.5 kWh/L, and a cost of $4/kWh, and by 2015, corresponding quantities of 3 kWh/kg (9 wt. %), 2.7 kWh/L, and $2/kWh. Four methods are being considered by the DOE as candidates for hydrogen storage: compression and storage in cryogenic tanks, adsorption by metal hydrides, adsorption on high surface area materials, and chemical hydrogen storage (including off-board regeneration) (Hydrogen storage roadmap.

High pressure storage needs high strength containers and has a limited volume capacity. A conventional steel hydrogen cylinder can hold only 1% by weight hydrogen and the boil-off of liquefied hydrogen requires venting, reduces driving range, and produces safety problems. Hydrogen liquefaction is also energy intensive at an expense of 30% of the heating value of hydrogen.

Metal hydrides are difficult to apply because they are too thermodynamically stable. This has two consequences. First, the hydrides have to be heated to an inconveniently high temperature to release hydrogen. Second, the heat of absorption is so high that a large amount of heat must be removed during the refueling process. Adsorption of hydrogen onto high surface area materials, such as carbon nanotubes, has been studied but also has barriers, including, for example, reproducibility of the material synthesis and hydrogen storage performance (Anson et al., *Nanotechnology* 15:1503, 2004). Compared with the above methods, chemical hydrogen storage provides high gravimetric and volumetric hydrogen densities. Additionally, chemical hydrogen storage has an advantage that hydrogen storage and transportation use conventional petrochemical substances (Biniwale et al., *Int. J. Hydrogen Energy* 33:360-365, 2008).

U.S. Pat. No. 3,479,165 discloses a hydrogen storage system using $MgH_2$ (magnesium hydride) that is decomposed at high temperatures and pressures. This patent was issued in 1969 and already recognized that magnesium hydride allegedly met the key criteria "easily reversible, fast reaction rates, side reactions eliminated to maintain purity, high weight percent hydrogen and low compound weight." Yet the DOE (Department of Energy) has focused most attention on one criterion, the energy density on a weight basis for hydrogen that can be released. Other key criteria of reversibility, speed of reaction rates and side reactions/purity appear not to have been considered. However, even in the 1960's, U.S. Pat. No. 3,479,165 further states: "it is noted that organic compounds containing hydrogen, although light in weight, are not free of side reactions which tend to severely limit the hydrogen purity. Thus, organic compounds also, are not suitable for hydrogen storage and transportation."

Organic chemical hydrides employ hydrogenation-dehydrogenation of cyclic hydrocarbons or heteroaromatic compounds as a means to store and transport hydrogen. Aromatic compounds, such as benzene, toluene, and naphthalene can be hydrogenated by using appropriate metal catalysts under relatively mild conditions, e.g. about 100° C. and 2 MPa. However, the dehydrogenation of cyclic hydrocarbons is endothermic and the reaction is favored only at high temperatures as well as having problems with coking on catalyst surfaces requiring catalyst regeneration every 1-2 hours. Catalytic dehydrogenation under "liquid-film state" conditions has been reported (Meng et al., *Int. J. Hydrogen Energy* 22:361-367, 1997; Hodoshima et al., *Int. J. Hydrogen Energy* 28; 197-204, 2003; Hodoshima et al., *Appl. Catal. A: Gen.* 292:90-96, 2005; and Hodoshima et al., *Appl. Catal. A: Gen.* 283:235-242, 2005), where the reactant is supplied as a liquid so that the surface of the catalyst is wetted with a thin film. Equilibrium limits were surpassed because of evaporation of the dehydrogenated reactants. Another method uses "wet-dry multiphase conditions" to take advantage of multiple phases to get over thermodynamic equilibrium limitations (Kariya et al., *Appl. Catal. A: Gen.* 247: 247-259, 2003; and Kariya et al., *Appl. Catal. A: Gen* 233:91-102, 2002). However, both processes still require relatively high temperatures for vaporization of the volatile components of the process. An important need is also an effective separation of hydrogen from the mixtures to get a pure hydrogen product and to reuse the hydrogen carrier materials.

Heteroatom aromatic rings for $H_2$ storage were proposed because the addition of electron-donating groups favors $H_2$ release both thermodynamically and kinetically at moderate temperatures. In the case of indoline, dehydrogenation is possible at modest temperature (110° C.) (Moores et al., *New J. Chem.* 30:1675-1678, 2006). Benzimidazolines, including N,N'-dimethyldihydrobenzimidazole, 1,3-dimethyl-2-phenylbenzimidazoline, and 1,3-dimethylbenzimidazoline, were studied with different palladium catalysts, releasing H$_2$ even at 80° C. (Schwarz et al., *Chem. Commun.* 5919-5921, 2005).

However, hydrogen density is an important factor in hydrogen storage, according to the DOE. Therefore, a lower weight of the organic framework is desired while maintaining favorable thermochemical and kinetic parameters. Smaller molecules, such as 4-aminopiperidine and piperidine-4-carboxamide are proposed compounds for reversible hydrogen storage (Cui et al., *New J. Chem.* 32:1027-1037, 2008). Dehydrogenation and hydrogenation of 4-aminopiperidine and piperidine-4-carboxamide occur at low temperatures without by-products, such as C—N cleavage and hydrogenolysis products. Dehydrogenation may be favored in five-membered rings over six member rings and by the incorporation of N heteroatoms into the rings, either as ring atoms or as ring substituents, particularly in 1, 3 positions (Clot et al. *Chem. Commun.* 2231-2233, 2007). Heteroaromatic ligands have been used for reversible hydrogenation/dehydrogenation, specifically N-ethyl carbazole hydrogenated with 72 atm and a Pd catalyst at 160° C. and dehydrogenated with Ru at 50-197° C. (U.S. Pat. No. 7,351,395, the disclosure of which is incorporated by reference herein). A thiol-based system is proposed in U.S. Pat. No. 7,186,396, the disclosure of which is incorporated by reference herein.

Therefore, the present disclosure provides a group of organic compounds that, under the specified reaction conditions, can satisfy the key criteria of easily reversible, fast reaction rates with minimal side reactions, in addition to the DOE criteria of high weight percent hydrogen and low compound weight.

SUMMARY

The present disclosure provides a process for releasing hydrogen from an alkane thiol and capturing a dehydrogenated product. Specifically, the disclosed process for releasing hydrogen gas from a C$_{5-7}$ alkane thiol comprises:

(a) providing a C$_{5-7}$ alkane thiol in a gaseous phase;

(b) exposing gaseous alkane thiol to a first catalyst surface at a temperature of from about 150° C. to about 300° C. to form a five-membered cyclic thioether substituted with from 1-2 methyl or ethyl groups and at least one mole of diatomic hydrogen gas; and (c) exposing the cyclic thioether having from 1-2 methyl or ethyl groups substituted thereon to a second catalyst surface at a temperature of from about 130° C. to about 400° C. to form a thiophene and two more moles of diatomic hydrogen gas.

Preferably, the first catalyst has an average particle size of from about 500 nm to about 2 nm. Preferably, the first catalyst surface comprises gold having an absence of nickel and chrome. Preferably, the catalyst is a particle selected from the group consisting of Au/TiO$_2$, Pt/SiO$_2$, Ag/SO$_2$, Au/Al$_2$O$_3$, Pt/Al$_2$O$_3$, Pd/Al$_2$O$_3$, Rh/Al$_2$O$_3$, and combinations of metals Au, Pt, Ag, Au, Pt, Pd and Rh with ceramic particles selected from the group consisting of TiO$_2$, SO$_2$, SiO$_2$, Al$_2$O$_3$ and combinations thereof. Preferably, the process further comprises capturing the cyclic thioether as a liquid or gaseous phase. Preferably, the alkane thiol is a pentane thiol or a hexane thiol or a heptane thiol, each having the thiol moiety at the N1 position or a mixture thereof. Preferably, the second catalyst surface is a platinum or gold or platinum/gold combination catalyst surface.

The present disclosure further provides a process for releasing hydrogen gas from a C$_{5-7}$ alkane thiol in a liquid state, comprising:

(a) providing the C$_{5-7}$ alkane thiol in a liquid phase;

(b) exposing liquid C$_{5-7}$ alkane thiol to a first catalyst surface wherein the first catalyst has an average particle size of from about 500 nm to about 2 nm at a temperature of from about 150° C. to about 300° C. to form a five-membered cyclic thioether having from 1-2 methyl or ethyl groups substituted thereon and one mole of diatomic hydrogen gas; and (c) exposing the cyclic thioether having from 1-2 methyl or ethyl groups substituted thereon to a second catalyst surface wherein the second catalyst has an average particle size of from about 500 nm to about 2 nm to form a substituted or unsubstituted thiophene and two more moles of diatomic hydrogen gas.

Preferably, the first catalyst surface comprises gold having an absence of nickel, chrome and copper. Preferably, the catalyst is a particle selected from the group consisting of Au/TiO$_2$, Pt/SiO$_2$, Ag/SO$_2$, Au/Al$_2$O$_3$, Pt/Al$_2$O$_3$, Pd/Al$_2$O$_3$, Rh/Al$_2$O$_3$, and combinations of metals Au, Pt, Ag, Au, Pt, Pd and Rh with ceramic particles selected from the group consisting of TiO$_2$, SO$_2$, SiO$_2$, Al$_2$O$_3$ and combinations thereof. Preferably, the process further comprises capturing the substituted or unsubstituted thiophene moiety as a liquid or gaseous phase. Preferably, the alkane thiol is a pentane thiol or a hexane thiol or a heptane thiol, each having the thiol moiety at the N1 positions or a mixture thereof. Preferably, the second catalyst surface is a platinum or gold or platinum/gold combination catalyst surface.

The present disclosure further provides a process for releasing hydrogen from a saturated substituted or unsubstituted cyclic thioether and capturing a dehydrogenated product. Specifically, the disclosed process for releasing diatomic hydrogen gas from a saturated substituted or unsubstituted cyclic thioether comprises:

(a) providing a saturated substituted or unsubstituted cyclic thioether having from 0-2 methyl or ethyl groups substituted thereon in a gaseous phase;

(b) exposing gaseous substituted or unsubstituted cyclic thioether to a catalyst surface, wherein the catalyst has an average particle size of from about 500 nm to about 2 nm at a temperature of from about 150° C. to about 300° C. to form a thiophene and two moles of diatomic hydrogen gas.

Preferably, the catalyst surface comprises gold or platinum, or a combination of gold and platinum particles. Preferably, the catalyst is a particle selected from the group consisting of Au/TiO$_2$, Pt/SiO$_2$, Ag/SO$_2$, Au/Al$_2$O$_3$, Pt/Al$_2$O$_3$, Pd/Al$_2$O$_3$, Rh/Al$_2$O$_3$, and combinations of metals Au, Pt, Ag, Au, Pt, Pd and Rh with ceramic particles selected from the group consisting of TiO$_2$, SO$_2$, SiO$_2$, Al$_2$O$_3$ and combinations thereof. Preferably, the process further comprises capturing the thiophene as a liquid or gaseous phase. Preferably, the substituted or unsubstituted cyclic thioether has from 0 to 2 C$_{1-2}$ alkane groups as the substitutions at positions at 2,4, or 3,5 of the thiophene at a ring carbon atom.

The present disclosure further provides a reactor for dehydrogenating a liquid organic material within a gaseous state, comprising:

(a) a vaporizer to convert the liquid organic material to a gaseous state having an inlet for the liquid organic material and an outlet;

(b) a microchannel reactor incorporating a dehydrogenation catalyst and having an inlet communicating with the outlet of the vaporizer and an outlet; and (c) a condenser/separator to condense gaseous dehydrogenated or partially dehydrogenated liquid organic material or hydrogenated liquid organic material into a liquid and release hydrogen gas, and having an inlet communicating with the outlet of the microchannel reactor and having two outlets, one for liquid materials and the other for gaseous hydrogen.

Preferably, the liquid organic material is a substituted or unsubstituted cyclic thioether having from 0 to 2 $C_{1-2}$ alkane groups as the substitutions at positions at 2,4, or 3,5 of the thiophene at a ring carbon atom. Preferably, the catalyst is a particle selected from the group consisting of $Au/TiO_2$, $Pt/SiO_2$, $Ag/SO_2$, $Au/Al_2O_3$, $Pt/Al_2O_3$, $Pd/Al_2O_3$, $Rh/Al_2O_3$, and combinations of metals Au, Pt, Ag, Au, Pt, Pd and Rh with ceramic particles selected from the group consisting of $TiO_2$, $SO_2$, $SiO_2$, $Al_2O_3$ and combinations thereof.

The present disclosure further provides a process for the delivery of hydrogen from an organic compound capable of reversible hydrogenation/dehydrogenation wherein the organic compound is initially in its hydrogenated form and subsequently catalytically dehydrogenated under dehydrogenation conditions in a reactor forming hydrogen and byproduct dehydrogenated organic compound, comprising:

(a) introducing the organic compound capable of reversible hydrogenation/dehydrogenation in liquid form to a microchannel reactor incorporating a dehydrogenation catalyst;

(b) vaporizing the organic compound in a vaporizer;

(c) effecting dehydrogenation of the organic compound (d) recovering a reaction product comprised of a byproduct dehydrogenated organic compound and gaseous hydrogen; and (e) separating and recovering the reaction product comprised of the dehydrogenated organic compound and gaseous hydrogen into a gaseous hydrogen fraction and liquid phase byproduct dehydrogenated organic compound.

Preferably, the liquid organic material is a substituted or unsubstituted cyclic thioether having from 0 to 2 $C_{1-2}$ alkane groups as the substitutions at positions at 2,4, or 3,5 of the thiophene at a ring carbon atom. Preferably, the dehydrogenation is carried out in a plurality of microchannel reactors wherein the pressure in each succeeding reactor is less than the prior reactor. Preferably, the dehydrogenation is carried out in a plurality of microchannel reactors wherein the temperature in each succeeding reactor is higher than the prior reactor.

DETAILED DESCRIPTION

Figure 1:
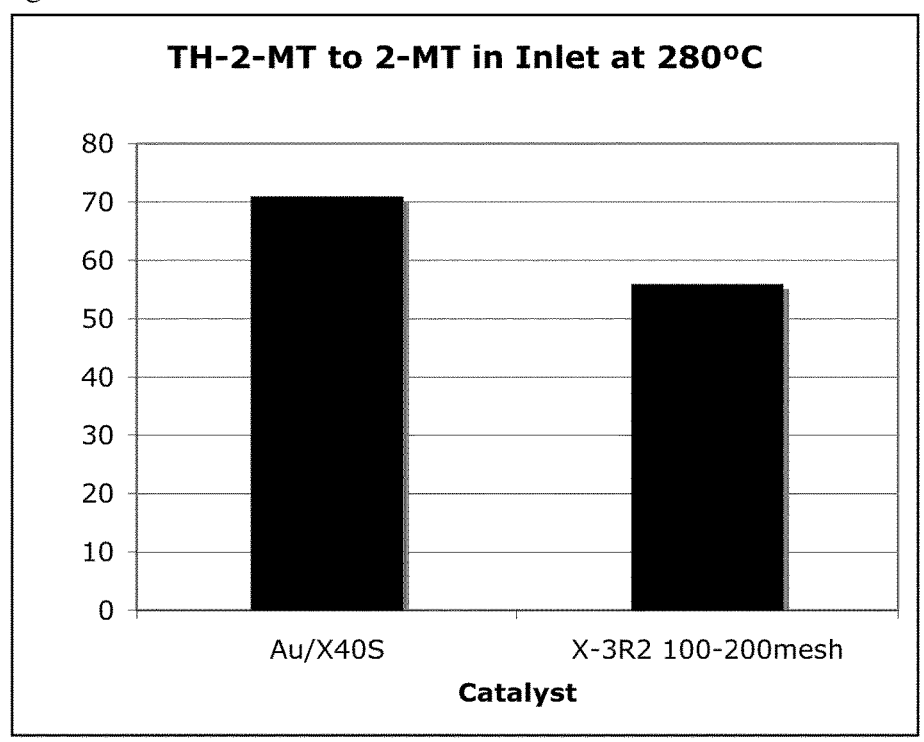
FIG. 1 shows a plot of percentage conversion of a cyclic thioether, 2-methyl tetrahydrothiophene, dehydrogenated to 2-methyl thiophene with the release of two moles of diatomic hydrogen per mole of 2-methyl tetrahydrothiophene. Two catalysts are used AuX40S and X-3R2, where the description of these catalysts is in Table 1. A sample of gaseous 2-methyl tetrahydrothiophene was injected through the catalyst, which was packed in the liner of a gas chromatograph (GC), with helium as a carrier gas at 1 ml/min and an operating temperature of 280° C. The detector was a mass spectrometer (MS).
Figure 2:
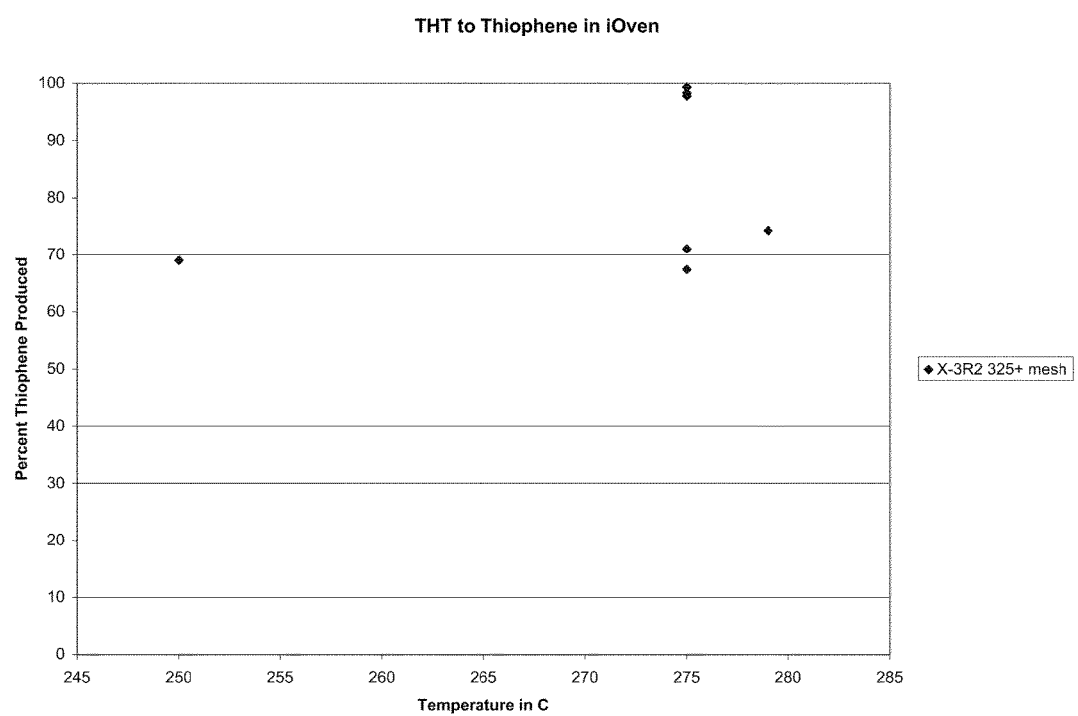
FIG. 2 shows a plot of percentage conversion of a cyclic thioether (tetrahydrothiophene) to thiophene with the release of two moles of diatomic hydrogen gas per mole of tetrahydrothiophene. The catalyst X-3R2, described in Table 1, was used at different temperatures as shown.
Figure 3:
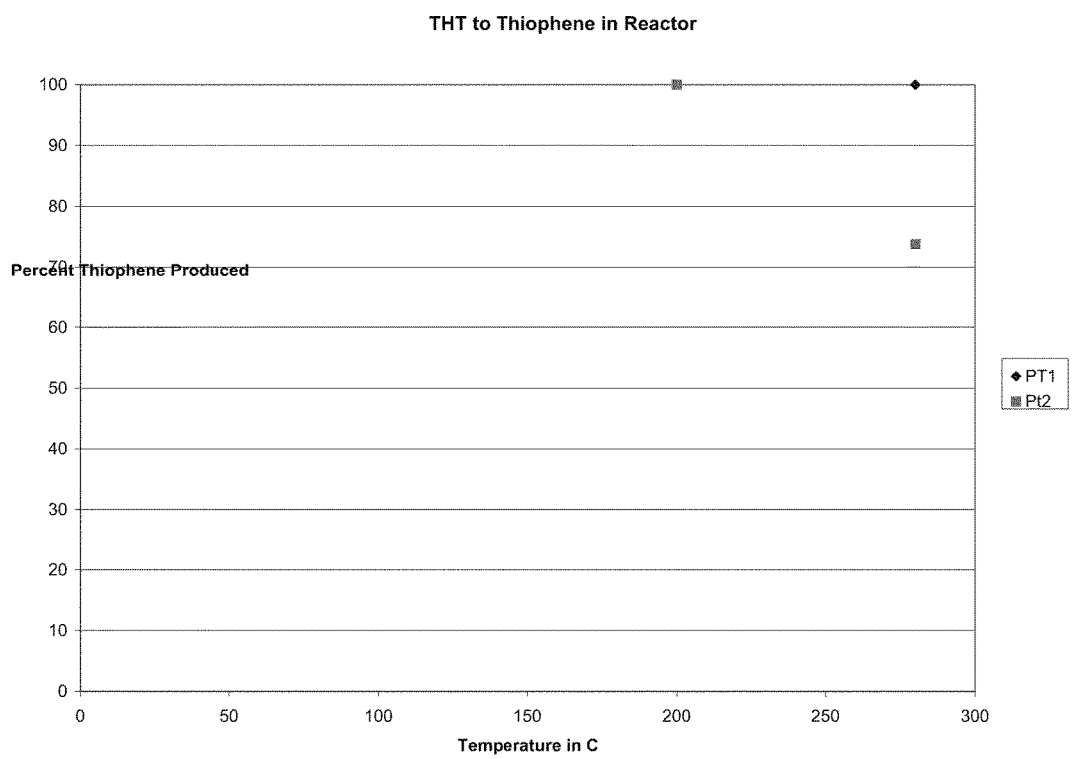
FIG. 3 shows a plot of percentage conversion of tetrahydrothiophene to thiophene with the release of two moles of diatomic hydrogen per mole of tetrahydrothiophene. The two batches of Pt-1 catalyst, described in Table 1, were implemented at different temperatures. The reaction was done in a "reactor", where the reactor was of a concentric tube design operating at either a stable 200 or 280° C. The inner reaction tube was a porous tube of γ-alumina containing catalyst particles between 5 and 50 nm in diameter. The pore size of the tubes used ranged between 20 and 200 μm. Tetrahydrothiophene was passed into the center of the reaction tube at rates between 0.5-1.5 mL/min. Samples of liquid trapped after the reaction were analyzed by gas chromatography mass spectrometry for tetrahydrothiophene and thiophene.

The present disclosure provides a process for releasing hydrogen from substituted or unsubstituted cyclic thioether and capturing a dehydrogenated product. Moreover, finely dispersed supported metal catalysts carry out the cyclization and dehydrogenation reaction of alkyl sulfides to thiophene, while at the same time releasing hydrogen.

Alkane thiols and 5 or 6 member ring heterocyclic molecules containing sulfur heteroatoms can reversibly produce hydrogen upon demand. The produced hydrogen can be used for the purposes of generating energy or in any other situation where hydrogen is used. In this regard, the thiol-based organic molecule, after it releases some but not all of its hydrogen atoms, is converted to a second stable organic molecule that is in a liquid state at typical environmental temperatures including winter temperatures. By virtue of having a liquid state organic molecule in both the hydrogenated and dehydrogenated states, both molecules can be distributed using existing petroleum infrastructure.

Thiol-Containing Organic Molecules
Synthesis of Pentane Thiol

Sodium (84 mg/3.64 mmol) was added to methanol (5 mL) at 0° C. After the sodium was dissolved, thioacetic acid (0.284 mL/3.97 mmol) was added slowly and allowed to stir for 10 minutes at 0° C. 1-bromopentane (500 mg/3.31 mmol) was added to the reaction mixture and the entire mixture was brought to a boil. The mixture was refluxed for 5 h, cooled, and concentrated by evaporation at reduced pressure. The resulting liquid was taken up in water and extracted three times into dichloromethane (~15 mL each time). The organic layers were combined and dried over sodium sulfate. The organic layer was filtered and concentrated by evaporation at reduced pressure. The crude product was then purified by Biotage® chromatography (5% ethyl acetate in hexanes), yielding 80 mg of the thioacetate (54.7 mmol/16% yield). This reaction was stopped at this point.

Potassium thioacetate (416 mg/3.64 mmol) was dissolved in dry, degassed methanol (15 mL) and combined with 1-bromopentane (500 mg/3.31 mmol). The reaction mixture was allowed to reflux overnight. After this time, the reaction was cooled and concentrated by evaporation. The resulting liquid was taken up in water and extracted three times into dichloromethane (~15 mL each time). The organic layers were combined and dried over sodium sulfate. The organic layer was filtered and concentrated by evaporation at reduced pressure, yielding 190 mg of pentylthioacetate (39% yield). The thioacetate was then dissolved in dry, degassed d4-methanol (1.2 mL) and chilled to 0° C. Under an atmosphere of nitrogen, acetyl chloride (370 µL/5.2 mmol) was added dropwise. After 15 minutes, the reaction mixture was allowed to warm to room temperature and stirred for an additional 8 hours, at which point a sample analyzed on GC/MS showed mainly dipentyl disulfide.

In a process to synthesize deuterated pentanethiol, potassium thioacetate (420 mg/3.68 mmol) was dissolved in dry, degassed methanol (15 mL) and combined with 4,4,5,5,5-(d5)-1-bromopentane (500 mg/3.20 mmol). The reaction mixture was allowed to reflux for 6 hours, then cooled and then stirred at room temperature for 36 hours. After this time, the reaction was concentrated by evaporation. The resulting liquid was taken up in water and extracted four times into dichloromethane (~20 mL each time). The organic layers were combined and dried over sodium sulfate. The organic layer was filtered and concentrated by evaporation at reduced pressure, yielding 0.364 g of d5-pentylthioacetate (75% yield). The d5-thioacetate was then dissolved in dry, degassed d4-methanol (1.2 mL) and chilled to 0° C. Under an atmosphere of nitrogen, acetyl chloride (684 µL/9.62 mmol) was added drop-wise. The reaction mixture was allowed to warm to room temperature and stirred for an additional 48 hours. After this time, the reaction was neutralized by adding saturated sodium bicarbonate, it was extracted four times into dichloromethane (~12 mL each time). The organic layers were combined and dried over sodium sulfate. The organic layer was filtered and concentrated by evaporation at reduced pressure, yielding 0.0569 g 4,4,5,5,5-(d5)-1-pentanethiol.

In a second deuterated synthesis process, potassium thioacetate (388 mg/3.40 mmol) was dissolved in dry, degassed methanol (15 mL) and heated for 15 minutes, then combined with d11-1-bromopentane (500 mg/3.08 mmol). The reaction mixture was allowed to reflux for 6 hours, then cooled and stirred at room temperature for 14 hours. After this time, the reaction was concentrated by evaporation. The resulting liquid was taken up in water and extracted three times into dichloromethane (~30 mL each time). The organic layers were combined and dried over sodium sulfate. The organic layer was filtered and concentrated by evaporation at reduced pressure, yielding 0.311 g of d11-pentylthioacetate (64% yield). The d11-thioacetate was then dissolved in dry, degassed d4-methanol (1.2 mL) and chilled to 0° C. Under an atmosphere of nitrogen, acetyl chloride (700 µL/8.08 mmol) was added drop-wise. The reaction mixture stirred at 0° C. for 30 minutes, then was allowed to warm to room temperature and stirred overnight. After this time, the reaction was neutralized by adding triethylamine (distilled from ninhydrin) and concentrated by evaporation. The reaction mixture was then taken up into $D_2O$ and extracted three times into dichloromethane. The organic layers were combined and dried over sodium sulfate. The organic layer was filtered and concentrated by evaporation at reduced pressure, yielding d-11-1-pentanethiol.

Catalysts
Gold on Controlled Porous Glass

Gold-coated thiolated glass powder was synthesized by suspending controlled pore glass, CPG, (obtained from Millipore, part numbers CPG00700B and CPG00700C) (5 g), in methanol and combining the suspension with triethylamine (1 mL) and 3-mercaptopropyltrimethoxysilane (0.25 mL/1.35 mmol). The reaction mixture was refluxed for 60 hours. After this time, the reaction mixture was filtered, and the powder was purified by Soxhlet extraction with ethanol and dried overnight in a vacuum oven. The resulting powder was then placed in an Erlenmeyer flask and combined with colloidal gold (reference: http://mrsec.wisc.edu/Edetc/nanolab/gold/index.html) and ethanol (approximately 50 mL colloidal gold and 3 mL Ethanol for every 0.5 g powder) and allowed to stir for 5 hours. The powder was then filtered and dried in vacuo.

MTB Catalysts

A gold nano-particle catalyst was synthesized by dissolving 500 mg of $HAuC_{l4}$ in 15 ml 18 MΩ/cm water. The pH of the solution was adjusted with 1N NaOH. 25 ml of 18 MΩ/cm water was then added to the gold solution. The catalyst substrate was added to the solution and stirred for 24 hours. The substrate was filtered and washed with 18 MΩ/cm water. The powder was vacuum dried. The catalyst was reduced at 200° C. for 2 hours in hydrogen at ramp rate 0.73° C./min and hydrogen flow of 54 ml/min.

MTB-4A is gold on TiO$_2$. MTB-5A is gold on γ-aluminum.

Other Catalysts

An X3R2 200-325 Mesh catalyst of porous glass substrate with immobilized gold particle size of 300 nm was obtained from Catholic University of America.

Gold powder spherical APS (5.5-9 micron with a 99.96% metal basis) was obtained from Alfa Aesar. Platinum black high surface area (97.42%) was obtained from Alfa Aesar.

Spherical, gold particles, with an average diameter between 0.5-0.8 μm, have successfully dehydrogenated alkane thiol to its corresponding thiophene (see, for example, U.S. Pat. No. 7,186,396, the disclosure of which is incorporated by reference herein). However, when the particle size was below 10 μm the catalyst became significantly more active. Preferred catalysts were immobilized on controlled pore glass, γ-alumina, carbon and on other high surface area substrates made via the sol-gel method.

A gold nanoparticle catalyst was synthesized by dissolving HAuC$_{l4}$ in 15 ml 18 MΩ/cm water. The pH of the solution was adjusted with 1N NaOH. 25 ml 18 MΩ/cm water was added to above pH adjusted gold solution. The above solution was added to aluminum oxide powder and was stirred for 24 hours. The powder was filtered and washed with ample amount of water. The powder was vacuum dried. The catalyst was reduced at 200° C. for 2 hours in hydrogen at ramp rate 0.73° C./min and hydrogen flow of 54 ml/min An X3R2 200-325 Mesh catalyst of porous glass substrate with immobilized nanogold particle size of 300 nm was received from Catholic University of America. Catalyst QSI-Nano PdAu was purchased from "QUANTUM SPHERE". Lot # BM113-12.

When creating the catalyst usually a short chain organic molecule with amine or thiol head group is covalently bonded to the surface of the catalyst support. Then the potentially active metals are deposited on the surface by reduction of their salts or by vapor deposition.

Preparation of First Catalyst Surfaces

A gold catalyst (5-10 μm in diameter) was packed in the liner of a GC, with helium as a carrier gas at 100 ml/min and an operating temperature of 280° C. The detector was either a thermal conductivity detector (TCD) or mass spectrometer (MS). Gold catalyst was obtained as a commercial powder.

Figure 4:
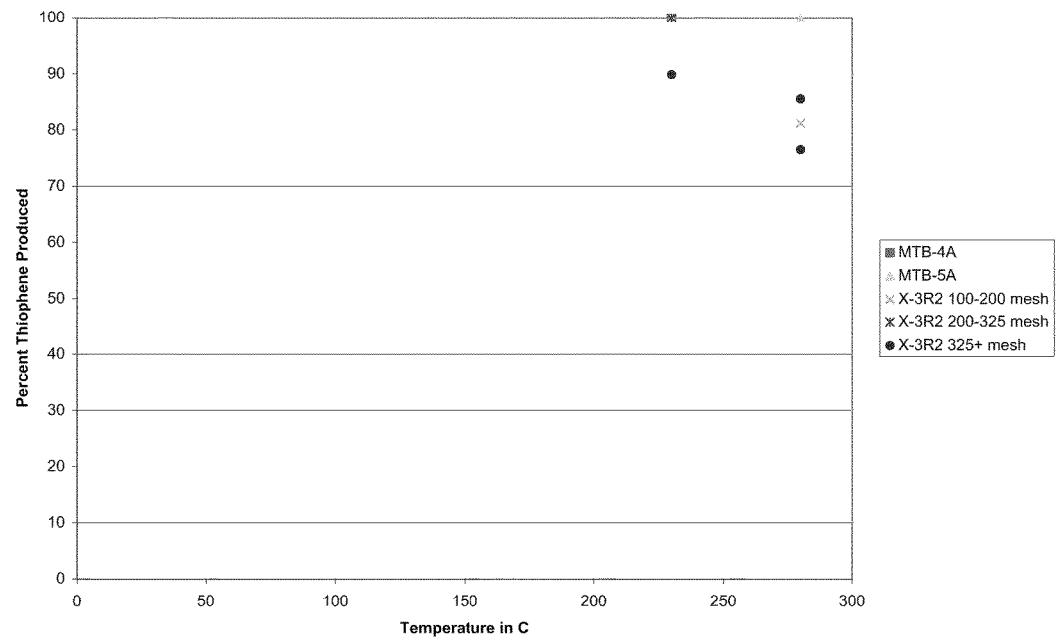
FIG. 4 shows a plot of percentage conversion of tetrahydrothiophene to thiophene with the release of two moles of diatomic hydrogen per mole of tetrahydrothiophene. Five catalysts were used, including catalyst X-3R2, MTB-4A and MTB-5A, each described in Table 1, at two different temperatures. A sample of tetrahydrothiophene vapor was injected through a catalyst packed in the liner of a gas chromatograph, with helium as a carrier gas at 1 ml/min and an operating temperature of 280° C. The detector was a mass spectrometer (MS).
Figure 5:
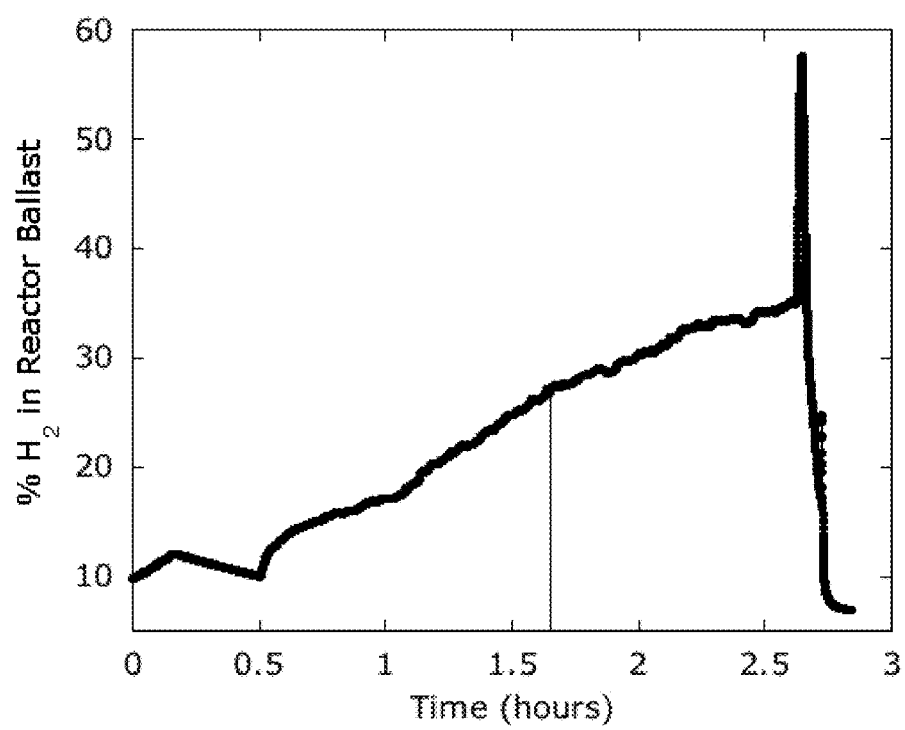
FIG. 5 shows the diatomic hydrogen content of a ballast tank as n-pentanethiol was processed in the reactor. The unsustained high increase of diatomic hydrogen at the end of the run was due to flushing the reactor out with helium. A packed bed reactor (¼ inch, sulfinert treated stainless steel tube) was maintained at a stable temperature of 280° C. for the duration of the study. The reactor was packed with three catalyst sections separated by quartz wool. The three catalyst sections were: Au-1 (1.99 g), Au-1/Pt-1 mixed (5.51 g Au/Pt 23:1) and Pt-1 (0.17 g), wherein the catalysts are described in Table 1. N-pentanethiol was vaporized and passed into the reactor at an equivalent rate of 1 μL/min. The emitted gas was collected in a ballast tank. Diatomic hydrogen was detected as a percentage of gas in the ballast tank.
Figure 6:
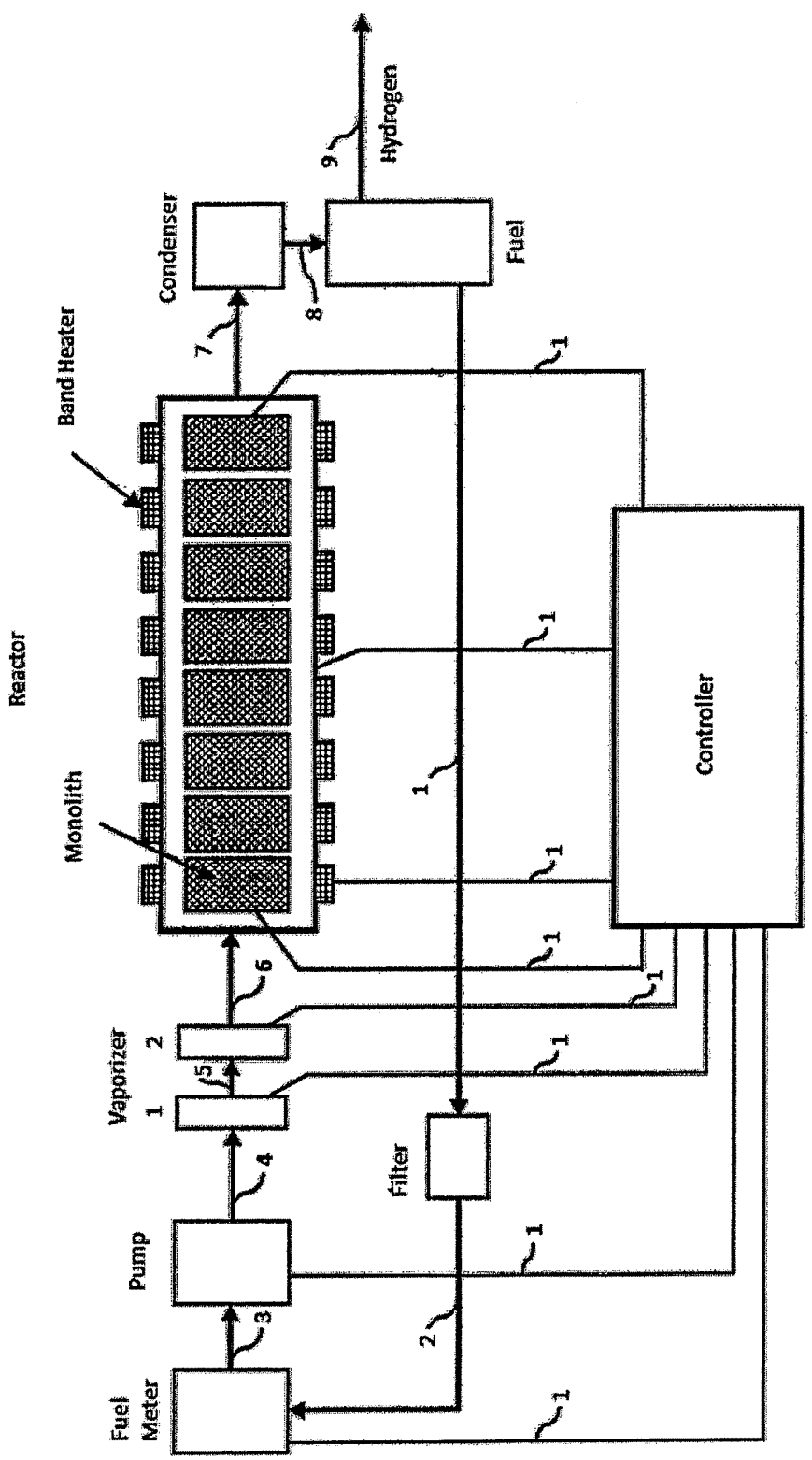
FIG. 6 is a schematic of the reactor set up described in Example 16.

Preparation of Second Catalyst Surfaces to thiophene or 2-methyl tetrahydrothophene to 2-methyl thiophene. The MTB-4A and MTB-5A catalysts (see FIG. 4) were gold on titanium oxide in the gold (article size of about 3-8 nm range for MBT-4A). MBT-5A is gold on aluminum oxide with a 3-8 nm range for the gold particles. Surface coverage of either aluminum oxide or titanium oxide substrates was in the range of 2-5%. Catalyst was supplied in powder form. Titanium oxide particles and aluminum oxide particles were about 4 μm in average particle size.

Gold on titanium oxide powder was made in a deposition precipitation process. Briefly, a gold chloride solution was mixed with a support (i.e., titanium oxide or aluminum oxide) at pH 7.0 (adding NaOH to the gold chloride solution to adjust pH to 7.0), followed by filtration and then drying under vacuum (1-100 mtorr) into a powder.

Specifically, MBT-4A used titanium oxide (anatase phase, Aldrich) 5000 mg, deionized (18 MΩ/cm) water (800 mg), gold chloride hydrate (Aldrich, AuCl$_4$) 500 mg and 1N NaOH (5400 μL), wherein gold chloride hydrate was dissolved in deionized water and the pH of the solution was adjusted to 7.0 by slowly adding 1N NaOH. Titanium oxide support or other substrate was added to this solution and the solution was stirred for 24 hours. The solution was filtered to obtain a powder/catalyst and the powder/catalyst was washed with water. The powder was vacuum dried for 24 hours at 1 mtorr. Lastly, the powder/catalyst was reduced at 200° C. for 2 hours in pure hydrogen (ramp rate of 0.73° C./min, hydrogen flow 50 ml/min).

Specifically, MBT-5A used aluminum oxide (gamma phase, Alfa Aesar) 5000 mg, deionized (18 MΩ/cm) water (800 mg), gold chloride hydrate (Aldrich, AuCl$_4$) 500 mg and 1N NaOH (5400 μL) wherein gold chloride hydrate was dissolved in deionized water and the pH of the solution was adjusted to 7.0 by slowly adding 1N NaOH. Aluminum oxide support or other substrate was added to this solution and the solution was stirred for 24 hours. The solution was filtered to obtain a powder/catalyst and the powder/catalyst was washed with water. The powder/catalyst was vacuum dried for 24 hours at 1 mtorr. Lastly, the powder/catalyst was reduced at 200° C. for 2 hours in pure hydrogen (ramp rate of 0.73° C./min, hydrogen flow 50 ml/min).

Table 1 below describes the different base catalysts used herein. The catalysts are described with regards to the name labeled to them, the active metal, the active metal particle size, the support, the support dimensions and the source of the catalyst.

TABLE 1

| Catalyst Name | Active Metal | Active Metal Particle Size (nm) | Support | Support Dimensions | Source |
|---|---|---|---|---|---|
| AuX40S | Gold (0.8 wt. %) | 6.7-10.5 | Carbon | 1100 m$^2$/g, pore volume 0.37 ml/g | World Gold Council |
| X-3R2 | Gold | ~300 | controlled porous glass | 44-74 μm | Catholic University of America |
| MTB-4A | Platinum (4-5 wt %) | 2-8 nm | gamma alumina | ~4 μm | In-House |
| MTB-5A | Platinum (4-5 wt %) | 2-8 nm | gamma alumina | ~4 μm | In-House |
| MTB-16 | Platinum (4-4.5 wt %) | 2-8 nm | gamma alumina | ~21 μm, 140 m$^2$/g | In-house |
| Au-1 | Gold | 5.5-9.5 μm | na | na | Alfa Aesar |
| Pt-1 | Platinum | 24-29 m$^2$/g | na | na | Alfa Aesar |
| AuTiO2-WGC | Gold | | Titanium Oxide | | World Gold Council |

Several catalysts of different particle sizes were tested out looking for conversion percentages of tetrahydrothiophene Table 2 reports concentrations for converting tetrahydrothiophene (THT) to thiophene as determined by GC/MS.

This reaction also release diatomic hydrogen expressed as a percentage of the gas passing through the hydrogen specific detector. A packed bed reactor was maintained at a stable temperature (290-370° C.) for each example. The reactor was packed with catalyst MTB-16, described in Table 1, wherein the platinum loading of the catalyst was 4-4.5% w/w. Liquid tetrahydrothiophene was continuously passed into the packed bed reactor (1 or 1.5 μL/min). Liquid samples (trapped after the reactor) were analyzed by gas chromatography with mass spectrometry for tetrahydrothiophene and thiophene. After the liquid traps, gas emissions passed through a hydrogen specific detector that determined percentage hydrogen in the gas stream.

TABLE 2

| | μl/min 1 Temperature (° C.) 290 | | |
|---|---|---|---|
| Time (min) | THT (mM) | Thiophene (mM) | Hydrogen (%*) |
| 0 | 0 | 0 | 0 |
| 15 | 0.01 | 0.09 | 0 |
| 30 | 0.13 | 0.23 | 0.74 |
| 45 | 0.81 | 0.41 | 1.64 |
| 60 | 1.74 | 0.57 | 1.68 |
| 75 | 2.24 | 0.83 | 1.33 |
| 90 | 2.84 | 0.92 | 0.9 |
| 105 | 4.26 | 1.27 | 0.59 |
| 120 | 5.95 | 1.60 | 0.43 |

| | μl/min 1 Temperature (° C.) 310 | | |
|---|---|---|---|
| Time (min) | THT (mM) | Thiophene (mM) | Hydrogen (%*) |
| 0 | 0 | 0 | 0 |
| 15 | 0 | 0.15 | 0.01 |
| 30 | 0.37 | 0.56 | 1.27 |
| 45 | 0.62 | 0.83 | 2.82 |
| 60 | 0.76 | 1.14 | 3.06 |
| 75 | 1.39 | 1.32 | 2.36 |
| 90 | 1.89 | 1.82 | 1.44 |
| 105 | 3.59 | 2.08 | 0.81 |

| | μl/min 1 Temperature (° C.) 325 | | |
|---|---|---|---|
| Time (min) | THT (mM) | Thiophene (mM) | Hydrogen (%*) |
| 0 | 0 | 0 | 0 |
| 15 | 0.04 | 0.33 | 0 |
| 30 | 0.11 | 0.87 | 1.74 |
| 45 | 0.69 | 1.58 | 4.02 |
| 60 | 1.5 | 2.27 | 4.45 |
| 75 | 1.53 | 2.77 | 2.94 |
| 90 | 2.39 | 3.64 | 1.72 |
| 105 | 3.49 | 4.12 | 0.95 |

| | μl/min 1 Temperature (° C.) 350 | | |
|---|---|---|---|
| Time (min) | THT (mM) | Thiophene (mM) | Hydrogen (%*) |
| 0 | 0 | 0 | 0.16 |
| 15 | 0 | 1.7 | 3.4 |
| 30 | 0.21 | 4.88 | 6.32 |
| 45 | 1.05 | 8.97 | 4.05 |
| 60 | 1.36 | 12.09 | 2.88 |
| 75 | 1.55 | 12.52 | 1.63 |

| | μl/min 1 Temperature (° C.) 370 | | |
|---|---|---|---|
| Time (min) | THT (mM) | Thiophene (mM) | Hydrogen (%*) |
| 0 | 0 | 0 | 0 |
| 15 | 0 | 6.66 | 0.02 |

TABLE 2-continued

| 30 | 0.1 | 16.93 | 3.23 |
| 45 | 0.25 | 32.83 | 6.84 |
| 60 | 0.41 | 55.94 | 8.41 |
| 75 | 0.68 | 72.37 | 8.81 |
| 90 | 1.07 | 74.54 | 6.73 |
| 105 | 1.27 | 72.88 | 3.35 |
| 120 | 1.37 | 84.01 | 1.73 |
| 135 | 0.98 | 53.04 | 0.85 |

Associated organic molecules, such as thiophenes, had been monitored as reaction byproducts. The alkane thiols reacted to form thiophenes with hydrogen being released. The reaction was repeated in a gas chromatograph (GC) equipped with a thermal conductivity detector (TCD). Hydrogen was released during the alkane thiol reaction. The experiment was repeated using a GC mass spectrometer (MS) with similar results.

The GCMS method provided samples at 40° C. for 3 minutes. Temperature was increased (10° C./min) until reaching 120° C. Next, temperature was ramped (25° C./min) until 260° C. and held for 8 minutes.

The dehydrogenation reaction of alkane thiols and cyclic thioethers was conducted at three different volume levels: gas phase, micro-liter and milliliter. This demonstrated reaction scalability. For gas phase, a gas chromatograph mass spectrometer (GC/MS) (78 mm×0.93 mmid) inlet liner was packed with catalyst (8.2 mm$^3$, 0.1-5 g). The inlet liner was placed in an inlet port of the GC/MS and was heated to desired temperature. The desired starting molecule (alkane thiol or cyclic thioether) was placed in a vial equipped with septum having some head space. The septum head space was vacuumed with a gas-tight syringe extracting 0.1-5 μl of headspace gases. The headspace gasses were injected into the GC/MS. Helium gas (8 psi) pushed the sample through catalyst into the GC column. The reaction took place in the inlet liner and it was directly monitored by MS instrument.

1.0 g of the catalyst was packed into a sulfinert treated stainless steel tube which was used for micro-liter volume level. The tube was packed with approximately 1.0 g of catalyst. During use, the tube was placed in a programmable oven. At the desired temperature, the tube containing catalyst was exposed to hydrogen for 1 hour, followed by helium for 1 hour. The reaction injected an alkane thiol or a cyclic thioether into the tube containing catalyst. Helium was the carrier gas. The tube output (including reaction products and unreacted starting material) was passed through methanol (as a carrier) to collect organic materials (but not hydrogen). Carrier methanol was sampled at increments of 0.5 hour, 1, 2, and 3 hours and analyzed by GC/MS to determine catalyst efficiency and conversion rate (using retention time and peak mass spectra). Temperature was a variable. Optimal temperature was determined.

Catalyst Synthesis, Pt—Rh/Al$_2$O$_3$ Catalyst

Pt—Rh bimetallic catalyst supported on gamma-alumina was synthesized by a sequential wet impregnation method. 724 mg of chloroplatinic acid (Sigma-Aldrich) was dissolved in 960 ml of distilled water. 6000 mg of gamma-alumina (CataloxScFa-140, Sasol America, surface area 140 sq·m/gm) was dispersed in above solution and stirred the mixture of 24 hours. Powder was filtered and washed with water and vacuum dried for 24 hours. Dry powder was reduced under hydrogen flow of 100 ml/min at 200° C. for 2 hours with ramp time of 4 hours. Rh was loaded on Pt loaded gamma-alumina by sequential impregnation. 372 mg of rhodium chloride (Sigma-Aldrich) was dissolved in 960 ml of distilled water. Pt loaded gamma-alumina was dispersed in above solution and stirred the mixture of 24 hours. Powder was filtered and washed with water and vacuum dried for 24 hours. Dry powder was reduced under hydrogen flow of 100 ml/min at 200° C. for 2 hours with ramp time of 4 hours. Catalyst was labeled as Pt—Rh/Al$_2$O$_3$ catalyst. Metal loading was measured by ICP/MS. Metal loading was 0.5 wt % for both metals.

Reactivity Measurement of Pt—Rh/Al$_2$O$_3$ Catalyst

Figure 7:
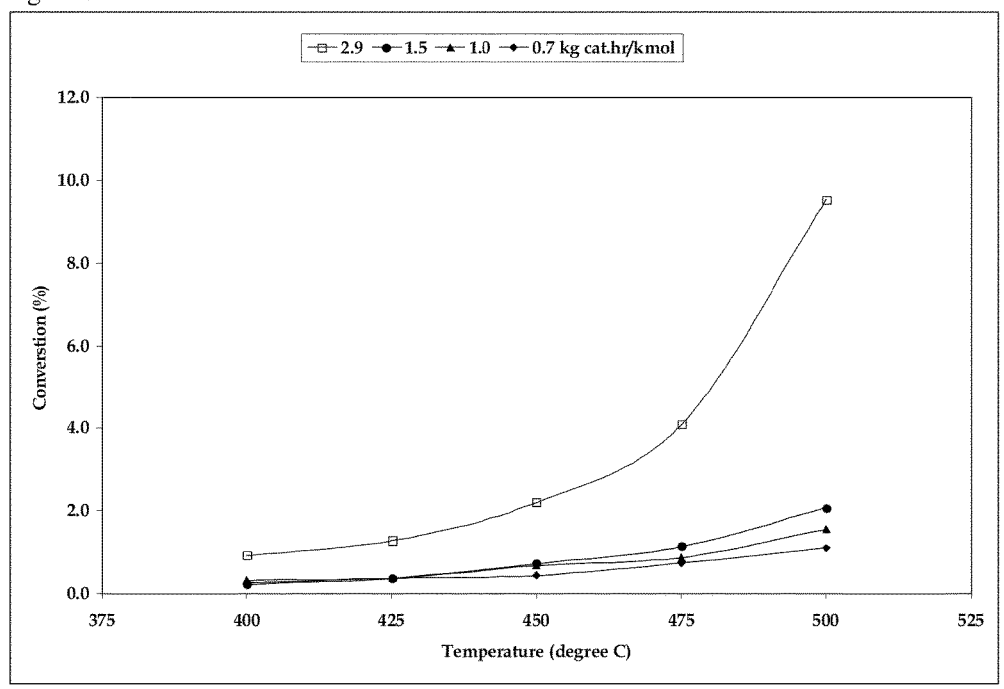
FIG. 7 shows that as temperature increases conversion (yield of thiophene) increases at constant space time. Conversion was calculated as (thiophene in product stream-thiophene in inlet stream)/(tetrahydrothiophene in inlet stream), as conversion was with respect to thiophene, it was equal to yield of thiophene. Apparent activation energy, calculated from these results, was 100 kJ/mol.
Figure 8:
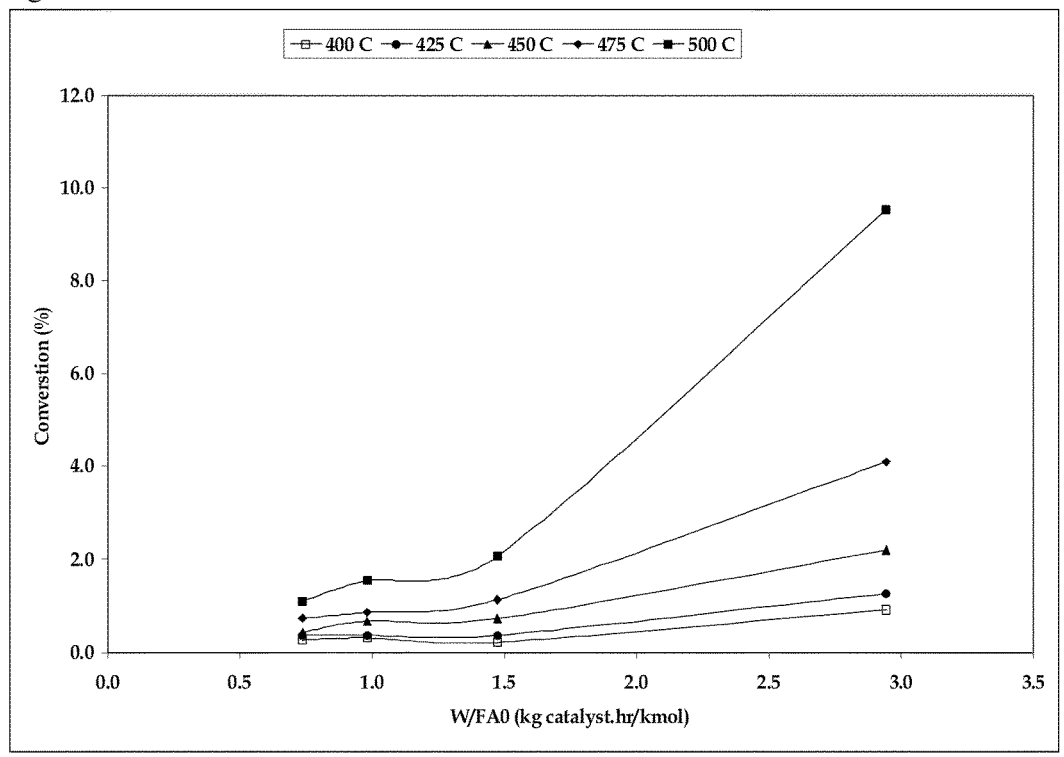
FIG. 8 shows that as space time increases conversion (yield of thiophene) increases at constant temperatures. Conversion was calculated as (thiophene in product stream-thiophene in inlet stream)/(tetrahydrothiophene in inlet stream), as conversion was with respect to thiophene, it was equal to yield of thiophene. Apparent activation energy, calculated from these results, was 100 kJ/mol.

Reactivity of catalyst was measured in packed bed flow reactor. 0.5 mg of catalyst was packed in ¼ inch ID tube with glass wool at both ends of catalyst. Catalyst was heated to reaction temperature and temperature at catalyst surface was measured by thermocouple and controlled by temperature controller. Tetrahydrothiophene was delivered to the reactor by dual piston pump and inlet volumetric flow rate was controlled by the pump. Tetrahydrothiophene was vaporized prior to reactor and vapor temperature was controlled and set at catalyst temperature. Product stream coming out of reactor was condensed to room temperature using ice cold water. Inlet stream and product stream were analyzed for tetrahydrothiophene and thiophene by GC/MS to calculate conversion. Reactivity of catalyst was measured at various temperatures and inlet reactant flow rates. Temperature of reaction was varied from 200° C. to 500° C. Inlet flow rate was varied from 0.25 to 1 ml/min that corresponds to space velocity of 8361 to 33447 ml/hr/gm of catalyst. Space velocity and space time are standard chemical engineering terms used in reaction kinetics to define reactor. Space velocity was defined as inlet gas volumetric flow rate divided by weight of catalyst. Space time was defined as weight of catalyst divided by inlet gas molar flow rate. Results of the studies are presented in FIGS. 7 and 8. Conversion was calculated as (thiophene in product stream-thiophene in inlet stream)/(tetrahydrothiophene in inlet stream), as conversion was with respect to thiophene, it was equal to yield of thiophene. FIG. 7 shows that as temperature increases conversion (yield of thiophene) increases at constant space time. FIG. 8 shows that as space time increases conversion (yield of thiophene) increases at constant temperatures. Apparent activation energy, calculated from these results, was 100 kJ/mol.

Other Catalysts

All catalysts were synthesized by wet impregnation method as described in synthesis details for Pt—Rh/Al$_2$O$_3$ catalyst. Aeroperl P25/20 was purchased from Evonik, Silica gel 60 was purchased from EMD chemicals while Catalox-ScFa140 was purchased from Sasol. All metal complexes were purchased from Sigma-Aldrich.

For Au/TiO$_2$, pH of gold chloride solution was adjusted to 7 with 1N sodium hydroxide prior to addition of titanium dioxide to solution. For Pd/Al$_2$O$_3$ catalyst, 37% HCl was added to water to make 2.5% HCl prior to addition of palladium chloride.

Details are summarized in the following Table 3.

| Catalyst | Support | Metal complex | Water (ml) | Support (mg) | Metal Complex (mg) |
|---|---|---|---|---|---|
| Au/TiO$_2$ | Aeroperl P25/20 | HAuCl$_4$ | 960 | 6000 | 600 |
| Pt/SiO$_2$ | Silica Gel 60 | Pt(NH$_3$)$_4$Cl$_2$ | 960 | 6000 | 588 |
| Ag/SiO$_2$ | Silica Gel 60 | AgNO$_3$ | 960 | 6000 | 300 |
| Au/Al$_2$O$_3$ | CataloxScFa140 | HAuCl$_4$ | 960 | 6000 | 600 |
| Pt/Al$_2$O$_3$ | CataloxScFa140 | H$_2$PtCl$_6$ | 960 | 6000 | 724 |
| Pd/Al$_2$O$_3$ | CataloxScFa140 | PdCl$_2$ | 895 | 6000 | 312 |
| Rh/Al$_2$O$_3$ | CataloxScFa140 | RhCl$_3$ | 960 | 6000 | 372 |

Reactivity of these catalysts was measured as described in reactivity measurement of Pt—Rh/Al$_2$O$_3$ catalyst above at space velocity of 8361 ml/hr/gm of catalyst. Summary of reactivity data at 400° C. is summarized in following Table 4. Reactivity is defined as mole of thiophene formed per unit time per unit weight of catalyst.

| Catalyst | Reactivity (mol/sec/gm cat) |
|---|---|
| Au/TiO$_2$ | 1.56E−07 |
| Pt/SiO$_2$ | 2.41E−07 |
| Ag/SiO$_2$ | 4.86E−07 |
| Au/Al$_2$O$_3$ | 1.51E−07 |
| Pt/Al$_2$O$_3$ | 1.61E−07 |
| Pd/Al$_2$O$_3$ | 2.44E−07 |
| Rh/Al$_2$O$_3$ | 4.66E−07 |
| Pt—Rh/Al$_2$O$_3$ | 8.16E−07 |

Figure 9:
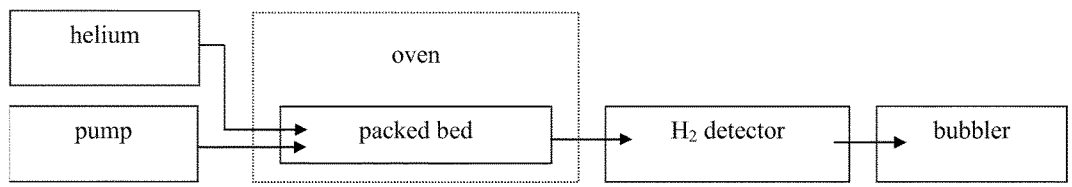
FIG. 9 shows a dehydrogenation apparatus. Specifically, the apparatus comprises a syringe pump (Harvard Apparatus, Pump 11) configured to deliver 1.0 μl/min of tetrahydrothiophene THT (Sigma-Aldrich, 99%) to a catalytic component (i.e., a reactor core) comprised of a packed bed containing of 2.48 g MTB-16 mixed with 4.73 g of crushed borosilicate glass in a 0.25×12.5 inch stainless steel tube (Restek, #22507). The reactor core was installed in an oven (Gow-Mac). A syringe (Hamilton) was charged with approximately 1.0 ml of THT enabling it to operate continuously for an 18 hour experiment.

A dehydrogenation apparatus (i.e., reactor), schematically depicted FIG. 9, was assembled and utilized in an experiment where tetrahydrothiophene (THT) was catalytically dehydrogenated at an elevated temperature with the concomitant release of hydrogen gas. The apparatus comprises a syringe pump (Harvard Apparatus, Pump 11) configured to deliver 1.0 μl/min of THT (Sigma-Aldrich, 99%) to a catalytic component (i.e., reactor core) comprised of a packed bed containing of 2.48 g MTB-16 mixed with 4.73 g of crushed borosilicate glass in a 0.25×12.5 inch stainless steel tube (Restek, #22507). The reactor core was installed in an oven (Gow-Mac). A syringe (Hamilton) was charged with about 1.0 μl of THT enabling it to operate continuously for an 18 hour experiment.

A supply of helium was connected to the catalytic component and adjusted to provide a continuous flow. Helium was used as an inert carrier to impart momentum to the mobile phase as is typical in gas chromatography. The operating pressure was adequate to support the flow rate.

A hydrogen detector (H2 Scan, Model 700, SN A000080) was installed inline and connected via a serial-USB adapter to a computer. This device was used to measure hydrogen concentration in a carrier gas flow 60 times per minute. These values are data-logged using HyperTerminal from a Windows XP operating system FIG. 10 was generated from these data points.

Following the hydrogen detector, a bubbler (custom-made) was installed. The bubbler was a gas impinging type device and nominally charged with approximately 6 μl of methanol. Gasses flowing through the system produce "bubbles" as they vent to the atmosphere which can be counted over a specified period of time (e.g., 60 seconds) to serve as an indication of gas flow. The bubbler has been calibrated to relate the number of "bubbles" per time to a certain volumetric flow rate as detected by a mass flow meter (Varian, Veriflow 500). The methanol in the bubbler prevented atmospheric gasses from entering the apparatus by forming an air-lock.

Figure 10:
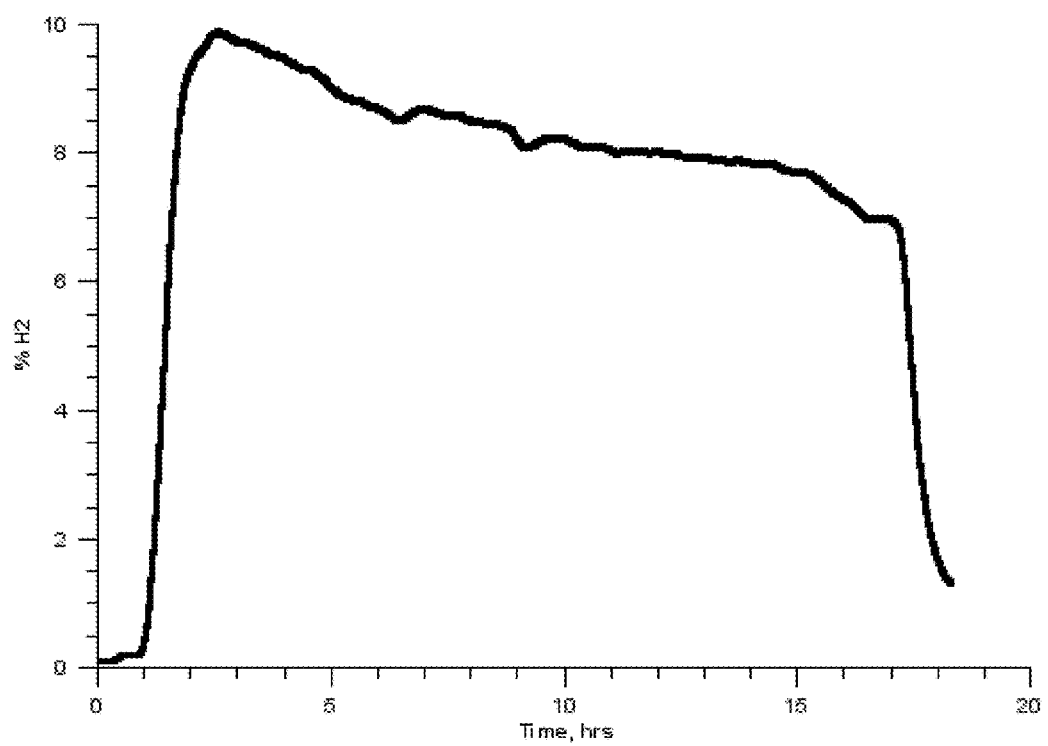
FIG. 10 describes the amount of hydrogen measured in a helium carrier gas with respect to time. The period of time from t=2.5 hrs to t=17 hrs represents the system at steady state. During this steady state period, the value of hydrogen measured in the helium carrier decreased from approximately 10% to 7% according to a linear model.

Each catalyst was heated to and held at 370° C. and the syringe pump operated for 18 hours. THT was carried through the catalyst where it was dehydrogenated. During the first 2.5 hrs of the experiment the concentration of hydrogen increased to 10%. The system operated for 15.5 hrs at steady state where the production of hydrogen remained relatively constant (FIG. 10). After 17 hrs, the syringe pump was stopped and THT was no longer delivered to the catalyst. The concentration of hydrogen in the helium carrier decreased and the experiment was terminated.

Hydrogen was produced through the dehydrogenation of THT according to the following reaction:

$$THT \rightarrow T + 2H_2 \quad [1]$$

For the purpose of this calculation, the actual dehydrogenation product, e.g., T in Eqn. 1 was somewhat irrelevant but it is taken as given that one mole of THT will liberate 2 moles of hydrogen gas. Using this as a basis, we computed the volumetric relationship (at S.T.P.) between THT and $H_2$ in units consistent and meaningful with the experimental data:

$$1 uL THT \times \frac{mL}{1000\ uL} \times \frac{1.0\ g}{mL} \times \frac{1\ mol\ THT}{88.10\ g} \times \quad [2]$$

$$\frac{2\ mol\ H_2}{1\ mol\ THT} \times \frac{22.4}{mol\ H_2} \times \frac{1000\ mL}{L} = 0.51\ mL\ H_2$$

Helium was used as a carrier gas and its flow rate was set to be 2.74 mL/min. This rate was assumed to be substantially constant throughout the experiment. Moreover, the hydrogen produced did not cause the rate to increase. This, this value represented the total gas flow rate during the experiment. This assumption, though incorrect, was accepted for two reasons: (1) The flow rate was not monitored continuously during the experiment so it cannot be reported that a change in flow rate was observed; and (2) It prevented an iterative-only solution whereby the flow rate must be assumed to increase by an amount proportional to the production of hydrogen which then requires a recalculation of the flow rate until the solution converges.

FIG. 10 describes the amount of hydrogen measured in a helium carrier gas with respect to time. The period of time from t=2.5 hrs to t=17 hrs represents the system at steady state. During this steady state period, the value of hydrogen measured in the helium carrier decreased from approximately 10% to 7% according to a linear model. In keeping with the algebraic solution, the average value over this 15.5 hr time period was assumed to be $$\frac{(10 + 7)\%}{2} = 8.5\%H_2 \quad [3]$$

Given our assumption that the total system flow rate was 2.74 µl/min, one can calculate the percentage of this value which must be due to hydrogen by using the following ratio:

$$\frac{n \frac{mL}{min} H_2}{2.74 \frac{mL}{min} total} = 0.085 \quad [4]$$

Solving for n gives the rate of hydrogen produced by the dehydrogenation of THT during the period of steady state. Specifically, $$n = 0.2329 \frac{mL}{min} H_2.$$

This value was 8.5% of the value measured for the helium carrier which has been assumed to be the total system flow rate. This is acceptable with respect to experimental error and justifies the algebraic solution.

Given the relationship demonstrated in equation 2 above, the amount of THT dehydrogenated, expressed as a fraction of that delivered, was determined from the ratio of hydrogen produced to the theoretical maximum:

$$\frac{0.2329 \frac{ml}{min} H_2}{0.51 \frac{ml}{min}} \times 100\% = 45.7\% \quad [5]$$

From this analysis, one can conclude that 45 percent of the THT delivered was dehydrogenated resulting in the liberation of hydrogen gas.

Calculation

The He flow rate=2.74 mL/min; the average steady state hydrogen percentage=8.5% and the maximum theoretical hydrogen yield: 1 µl THT=0.51 ml $H_2$ The calculated conversion is: n mL/min $H_2$/2.74 ml/min total=0.085:

n=0.2329 ml/min $H_2$

100%×0.2329 ml/min/0.51 ml/min=45.7%

Tetrahydrothiophene (Sigma-Aldrich, 99%) was delivered at a flow rate of 1 µl/min using a syringe pump (Harvard Apparatus, Pump 11) to a packed bed consisting of 2.48 g MTB-16 mixed with 4.73 g of crushed borosilicate glass in a 0.25×12.5 inch stainless steel tube (Restek, #22507) installed in an oven (Gow-Mac) and held at a temperature of 370° C. for 18 hours with a helium carrier gas flowing at a rate of 2.74 ml/min. The system achieved steady state at t=2.5 hrs and continued to t=17 hrs at which time the experiment was terminated. The percentage of hydrogen was measured in the helium carrier by a proportional hydrogen detector (H2 Scan, Model 700, SN A000080). The average value during the steady state period was 8.5%. It has been calculated that the average yield of hydrogen through dehydrogenation of tetrahydrothiophene during the steady state period was 45.7%.

Microchannel Reactors for Dehydrogenation of Thioesters Converted to the Vapor State Microchannel reactors, which term is intended by definition to include monolith reactors, are well suited for a vapor phase dehydrogenation process. They offer ability to effect the dehydrogenation of hydrogen fuel sources while obtaining excellent heat transfer and mass transfer. One can pump the liquid fuel to a vaporizer which then enters a reactor containing the appropriate catalysty. Thus, pressure drop does not become an insurmountable problem as it is in gas phase production of hydrogen.

Microchannel reactors and monolith reactors are known in the art. The microchannel reactors are characterized as having at least one reaction channel having a dimension (wall-to-wall, not counting catalyst) of 2.0 mm (preferably 1.0 mm) or less, and in some embodiments 50 to 500 mm. The height and/or width of a reaction microchannel is preferably 2 mm or less, and more preferably 1 mm or less. The channel cross section may be square, rectangular, circular, elliptical, etc. The length of a reaction channel is parallel to flow through the channel. These walls are preferably made of a nonreactive material which is durable and has good thermal conductivity. Most microchannel reactors incorporate adjacent heat transfer microchannels, and in practice, such reactor scheme generally is necessary to provide the heat required for the endothermic dehydrogenation. Illustrative microchannel reactors are shown in US 2004/0199039 and U.S. Pat. No. 6,488,838 and are incorporated by reference herein.

Monolith supports, which may be catalytically modified and used for catalytic dehydrogenation, are honeycomb structures of long narrow capillary channels, circular, square or rectangular, whereby the vaporized fuel and generated dehydrogenated product and hydrogen gas can co-currently pass through the channels. Typical dimensions for a honeycomb monolith catalytic reactor cell wall spacing range from 1 to 10 mm between the plates. Alternatively, the monolith support may have from 100 to 800, preferably 200 to 600 cells per squared inch (cpi). Channels or cells may be square, hexagonal, circular, elliptical, etc. in shape.

In a representative dehydrogenation process, a liquid fuel, such as tetrahydrothiophene, is vaporized (see FIG. 9) 1, 2 by means of a pump (4) to an initial, preselected reaction pressure, e.g., 1000 psia and delivered via manifold 6 to a plurality of reaction chambers (monoliths) within a first microchannel reactor. Overall dehydrogenation pressures may range from 0.2 to 100 atmospheres. In FIG. 9, dehydrogenation catalyst particles are packed within the monoliths, although, as an alternative, the catalyst may be embedded, impregnated or coated onto the wall surface of the monoliths. The reaction channel through the monoliths may be a straight channel or with internal features such that it offers a large surface area to volume of the channel.

Heat is supplied to the microchannel reactor by a series of band heaters (FIG. 9). Alternatively, there may be a circulating a heat exchange fluid through a series of heat exchange channels adjacent to the monoliths. The heat exchange fluid may be in the form of a gaseous byproduct of combustion which may be generated in a hybrid vehicle or hydrogen internal combustion engine or it may be a heat exchange fluid employed for removing heat from fuel cell operation. In some cases, where a liquid heat exchange fluid is employed, as for example heat exchange fluid from a fuel cell, supplemental heat may be added, through the use of a combustion gas or thermoelectric unit. The heat exchange fluid from a PEM (proton exchange membrane) fuel cell typically is recovered at a temperature of about 80° C., which is at the low end of the temperature for dehydrogenation. By the use of combustion gases it is possible to raise the temperature of the heat exchange fluid to provide the necessary heat input to support dehydrogenation of many of the fuel sources. A heat exchange fluid from fuel cells that operate at higher temperatures, e.g., 400° C. may also be employed.

In the embodiment shown in FIG. 9, dehydrogenation is carried out in microchannel reactor at a temperature of generally from about 200 to 400° C., at some pressure of hydrogen. Dehydrogenation is favored by higher temperatures, elevated temperatures; e.g., 400° C. and above may be required to obtain a desired dehydrogenation reaction rate. Because initial, and partial, dehydrogenation of the vaporized liquid fuel source occurs quickly, high pressures are desired in the initial phase of the reaction in order to facilitate control of the liquid to gas ratio that may occur near the exit of the reactor chambers.

After a preselected initial conversion of vaporized fuel in microchannel reactor is achieved, e.g., one-third the volume of the hydrogen to be generated, the reaction product comprised of hydrogen and partially or near fully dehydrogenated liquid fuel is sent by gas line 7 to a condenser 8 or phase separator. Hydrogen is removed at high pressure as an overhead via line 9 and a high pressure partially or near fully dehydrogenated liquid fuel source is removed as a bottoms fraction ("fuel" in FIG. 9). Condensation-based separation is favored to minimize carry over of unconverted liquid hydrocarbon fuel. Advantageously, then the reaction product need not be quenched and thus rendered liquid in order to effect efficient separation of the partially dehydrogenated organic compound from the hydrogen and minimize carryover into the hydrogenated product. This is a favored feature in contrast to those dehydrogenation processes which use reactants such as isopropanol, cyclohexane and decalin where the dehydrogenation reaction products are in the gas phase.

The bottoms from condensor separator is combined and charged by a flow meter (FIG. 9) and new fuel added at the same or higher temperature in order to maintain reaction rate.

On recovery from the condenser gas/liquid separator, the resulting and partially dehydrogenated liquid fuel may be reduced in pressure than normally occurs because of the ordinary pressure drop which occurs in microchannel reactor. The reaction product comprised of hydrogen and further partially or near fully dehydrogenated liquid fuel is removed via a manifold (not shown) and separated in condenser gas/liquid separator. Hydrogen is removed as an overhead from condenser gas/liquid separator via line 9 and a further dehydrogenated liquid fuel is removed from the bottom of condensor gas/liquid separator via line 1. Heat exchange fluid can be withdrawn from the microchannel reactor and returned to heat exchange fluid return.

In the event that the dehydrogenation product contains traces of organic compounds, these may be removed if desired by passing the gas stream through an adsorbent bed (not shown) or an appropriate separator for the trace organic impurity.

Although, the dehydrogenation process has been described employing one microchannel reactor, other apparatus designs and operating conditions may be used and are within the context of this disclosure. The operation parameters are one of process design. The use of multiple reactors allows for better control of dehydrogenation of the liquid fuel occurs in the reaction chambers in a vaporized state as well as providing for optimized pressures in dehydrogenation of the various organic fuel sources.

Example 1

The inlet liner of GC/MS (78 mm×0.93 mm i.d.) was packed with X-3R2 catalyst (200-325 mesh, 0.2 g). The liner was placed in the inlet port of the instrument and it was heated to 280° C. Pentane thiol (1 ml, degassed) (sample) was placed in a vial equipped with septum. The head space of the vial was vacuumed. A gas-tight syringe extracted headspace gasses (0.1-5 µl) which were injected into a GC/MS. Helium gas (8 psi) pushed the sample through the catalyst and into the GC column. The reaction was monitored by a mass detector and produced 91% 2-methylthiophene and hydrogen release.

Example 2

The inlet liner of GC/MS (78 mm×0.93 mm i.d.) was packed with X-3R2 catalyst (200-325 mesh, 0.2 g). The liner was placed in the inlet port of the instrument and it was heated to 230° C. Pentane thiol (1 ml, degassed) (sample) was placed in a vial equipped with septum. The head space of the vial was vacuumed. A gas-tight syringe extracted headspace gasses (0.1-5 µl) which were injected into a GC/MS. Helium gas (8 psi) pushed the sample through the catalyst and into the GC column. The reaction was monitored by a mass detector and produced 90% 2-methylthiophene and hydrogen release.

Example 3

The inlet liner of a GC/MS (78 mm×0.93 mm i.d.) was packed with Au/S (0.35 g) catalyst obtained from The Gold Council (see Table 1 above). The liner was placed in the inlet port of the instrument and it was heated to 170° C. Pentane thiol (1 ml, degassed) (sample) was placed in a vial equipped with a septum. The head space of the vial was vacuumed. A gas-tight syringe extracted headspace gasses (0.1-5 µl) which were injected into a GC/MS. Helium gas (8 psi) pushed the sample through the catalyst and into the GC column. The reaction was monitored by mass detector and produced 68% 2-methylthiophene and hydrogen release.

Example 4

The inlet liner of a GC/MS (78 mm×0.93 mm i.d.) was packed with MTB-8B (0.35 g) catalyst obtained from The Gold Council (seed Table 1 above). The inlet liner was placed in the inlet port of the GC/MS and it was heated to 170° C. Pentane thiol (1 ml, degassed) (sample) was placed in a vial equipped with a septum. The head space of the vial was vacuumed. A gas-tight syringe extracted headspace gasses (5 µl) which were injected into a GC/MS. Helium gas (8 psi) pushed the sample through the catalyst and into the GC column. The reaction was monitored by the mass detector and produced 74% 2-methylthiophene and hydrogen release.

Example 5

The inlet liner of a GC/MS (78 mm×0.93 mm i.d.) was packed with X-3R2 catalyst (200-325 mesh, 0.33 g). The liner was placed in the inlet port of the GC/MS and it was heated to 230° C. Tetrahydrothiophene (1 ml, degassed) (sample) was placed in a vial equipped with a septum. The head space of the vial was vacuumed. A gas-tight syringe extracted headspace gasses (0.1 µl) which were injected into a GC/MS. Helium gas (8 psi) pushed the sample through the catalyst and into the GC column. The reaction was monitored by the mass detector and produced 88% thiophene and hydrogen release.

Example 6

The inlet liner of a GC/MS (78 mm×0.93 mm i.d.) was packed with Au/CPG catalyst (325+ mesh, 0.15 g). The liner was placed in the inlet port of the GC/MS and it was heated to 280° C. Tetrahydrothiophene (1 ml, degassed) (sample) was placed in a vial equipped with a septum. The head space of the vial was vacuumed. A gas-tight syringe extracted headspace gasses (0.1 µl) which were injected into a GC/MS. Helium gas (8 psi) pushed the sample through the catalyst and into the GC column. The reaction was monitored by a mass detector and produced 88% thiophene and hydrogen release.

Example 7

The inlet liner of a GC/MS (78 mm×0.93 mm i.d.) was packed with MTB-4A catalyst (0.15 g). The liner was placed in the inlet port of the GC/MS and it was heated to 230° C. Tetrahydrothiophene (1 ml, degassed) (sample) was placed in a vial equipped with a septum. The head space of the vial was vacuumed. A gas-tight syringe extracted headspace gasses (2 µl) which were injected into a GC/MS. Helium gas (8 psi) pushed the sample through the catalyst and into the GC column. The reaction was monitored by a mass detector produced 100% thiophene and hydrogen release.

Example 8

The inlet liner of a GC/MS (78 mm×0.93 mm i.d.) was packed with MTB-16 catalyst (0.22 g). The liner was placed in the inlet port of the GC/MS and it was heated to 200° C. Tetrahydrothiophene (1 ml, degassed) (sample) was placed in a vial equipped with a septum. The head space of the vial was vacuumed. A gas-tight syringe extracted headspace gasses (8 µl) which were injected into a GC/MS. Helium gas (8 psi) pushed the sample through the catalyst and into the GC column. The reaction was monitored by a mass detector and produced 100% thiophene and hydrogen release.

Example 9

MTB-16 catalyst (5.28 g) was packed into a sulfinert treated stainless steel tube and the tube was placed in a programmable oven. The catalyst was exposed to hydrogen for 1 hour, followed by helium for 1 hour at 280° C. Tetrahydrothiophene was injected into the tube (1 µL/min) and passed over the catalyst. Helium was a carrier gas. The output of the tube was passed through methanol (hydrogen passed through the methanol and organic products collected in methanol) and produced 100% thiophene and hydrogen release.

Example 10

MTB-15 catalyst (4.99 g) was packed into a sulfinert treated stainless steel tube and the tube was placed in a programmable oven. The catalyst was exposed to hydrogen for 1 hour, followed by helium for 1 hour at 280° C. Tetrahydrothiophene was injected into the tube (1 µL/min) and passed over the catalyst. Helium was the carrier gas. The output of the tube was passed through methanol (hydrogen passed through the methanol and organic products collected in methanol) and produced 100% thiophene and hydrogen release.

Example 11

Au/CPG catalyst (325+ mesh, 0.70 g) was packed into a sulfinert treated stainless steel tube and the tube was placed in a programmable oven. The catalyst was exposed to hydrogen for 1 hour, followed by helium for 1 hour at 280° C. Tetrahydrothiophene was injected into the tube (1 µL min) and passed over the catalyst. Helium was the carrier gas. The output of the tube was passed through methanol (hydrogen passed through the methanol and organic products collected in methanol) and produced 99% thiophene and hydrogen release.

Example 12

Au/CPG catalyst (325+ mesh, 0.70 g) was packed into a sulfinert treated stainless steel tube and the tube was placed in a programmable oven. The catalyst was exposed to hydrogen for 1 hour, followed by helium for 1 hour at 275° C. Tetrahydrothiophene was injected into the tube (1 µL/min) and passed over the catalyst. Helium was the carrier gas. The output of the tube was passed through methanol (hydrogen passed through the methanol and organic products of the reaction collected in methanol) and produced 99.45% thiophene and hydrogen release.

Example 13

The inlet liner of a GC/MS (78 mm×0.93 mm i.d.) was packed with Au/X40S catalyst (0.18 g). The inlet liner was placed in the inlet port of the GC/MS and heated to 280° C. Tetrahydro-2-methylthiophene (1 ml, degassed) (sample) was placed in a vial equipped with a septum. The head space of the vial was vacuumed. A gas-tight syringe extracted headspace gasses (3 µl) which were injected into a GC/MS. Helium gas (8 psi) pushed the sample through the catalyst and into the GC column. The reaction was monitored by a mass detector and produced 100% 2-methylthiophene and hydrogen release.

Example 14

The inlet liner of a GC/MS (78 mm×0.93 mm i.d.) was packed with MTB-5A catalyst (0.25 g). The liner was placed in the inlet port of the GC/MS and it was heated to 230° C. Tetrahydrothiophene (1 ml, degassed) (sample) was placed in a vial equipped with a septum. The head space of the vial was vacuumed. A gas-tight syringe extracted headspace gasses (1 µl) which were injected into a GC/MS. Helium gas (8 psi) pushed the sample through the catalyst and into the GC column. The reaction was monitored by a mass detector and produced 100% thiophene and hydrogen release.

Example 15

This example illustrates the ability of a catalyst bed in a packed bed reactor to be able to continue to catalyze the dehydrogenation of tetrahydrothiophene for long periods of time without requiring catalyst regeneration. A packed bed reactor, packed with a catalyst bed of MTB-16 (Table 1 above) having platinum loading of 4-4.5% w/w, was maintained at a stable temperature (298-378° C.) for 55.76 hours. Liquid tetrahydrothiophene was continuously passed into the packed bed reactor at rates of either 1.0 or 1.5 µL/min. The reactor produced a total of 15 L diatomic hydrogen gas continuously over the 55+ hours it was continuously run. These data show the ability to not only dehydrogenate tetrahydrothiophene with the MTB-16 catalyst, but to do so continuously over long periods of time.

Example 16

This example illustrates the ability of a catalyst in a multi channel Monolith reactor to be able to continue to catalyze the dehydrogenation of tetrahydrothiophene for long periods of time without requiring catalyst regeneration and external carrier gas. The set up is as follows:

A DOW Corning ceramic cylinder (3.66"×3", 400 cells per square inch)(9.3 cm×7.62 cm 64 cells per square cm), with cell dimensions 500 micron square on a side (Manufactured by Hypercat ACP West Chester, Pa. 19382) was loaded with Pd catalyst by manufacturer at 15 g/ft$^3$. This cylinder was placed in a 316 stainless steel tubing (4" diameter 9" long)(10.16 cm diameter 22.86 cm long) wrapped with 2 monoliths graphite sheathing to provide heat transfer from exterior tube walls to inner monoliths. The end of monolith circumference was sealed with glass matting. Two 6" (15.24 cm) diameter conflat flanges were welded to each end of this tube. The flanges and the tube were mounted together using gold plated copper gaskets. Two 400 watt (1400 kj/h) band heaters were placed on the exterior of the tube and spaced equally apart.

There were two ¼" (0.635 cm) Swagelok fittings on each end plate, one for thermocouple entrance and the other is for fuel (THT or tetrahydrothiophene) in the inlet side and spent fuel (thiophene) and hydrogen in the outlet side. There were 4 reactor sections which made up the entire reactor. Three Type K thermocouples were placed on the exterior of the reactor section. One was on the inlet, one was in the middle of the span, and the last was on the outlet. The entire reactor was wrapped in a 3" (7.62 cm) thick layer of glass wool for insulation.

Fuel was delivered continuously by a pump (purchased from Micropump Inc. Vancouver, Wash. 98684, Pump Head Model 81113 GA-V21.CFS). Software that controls fuel flow rate was monitored by a Labview (National instruments Labview Version 8) and the rate was governed by a PID loop in the Labview application. Liquid fuel was pumped to a vaporizer, which was a 316 Stainless Steel tubing ⅛" (0.3175 cm) outer diameter 0.0625" (0.159 cm) inner diameter 36 feet (11 m) long wrapped around circumference of rod.

The vaporizer tube was heated by Cartridge Heater (½" (1.27 cm) diameter 6" (15.24 cm) long 1 kw (3600 kJ/h) 120 VAC, Watlow Corporation) and the temperature was monitored by thermocouple Type K at three locations, inlet, outlet and middle. The whole unit was encapsulated in high temperature epoxy.

There were two vaporizers connected in series. The first vaporizer was set to a temperature of 280° C., the second was set for the final reactor operating temperature of 400° C. Hydrogen gas was detected by specific hydrogen detector (purchased from H2 scan Corp Valencia, Calif. 91355, Model Number 700 SN A000080).

Liquid THT was pumped to a vaporizer at 0.5 ml per second. The first vaporizer was at 280° C. and the second one was at 400° C. The reactor temperature was at 400° C. This reactor produced continuously hydrogen gas between 2 and 2.5 liters per minute at 5 psi (34.47 kPa) pressure. The reactor was run with same set up once for up to 1 hour. This gave an average of 14% conversion or yield.

Approximately 1.8 liters of spent THT from multiple reactor runs was combined and consolidated in 3 L round bottom, boiling flask (ChemGlass, CG-1506) and connected to a distillation head. The distillation head comprised a 150 mm vigreux column (ChemGlass, CG-1231) and a water-cooled condenser (ChemGlass, CG-1239). The charge was heated by a heating mantle (Glas-Col, #0410) controlled by a variac (Superior Powerstat, 2PN116C) and the distillation conducted in the usual manner. The fraction boiling between 119-121° C. was collected. Three primary fractions existed:
F1—low boiling, 400 mL (approximately);
F2—THT (tetrahydrothiophene) fraction, 1200 mL (approximately); and
F3—high boiling, 200 mL (approximately).

The amount of THT reclaimed from a 1.8 L charge was about 67%. GC/MS analysis detected that the F2 fraction had of 98.7% THT and 1.3% T (a trace amount of DHT (dihydrothiophene)).

We claim:
1. A process for the delivery of hydrogen from an organic compound capable of reversible hydrogenation/dehydrogenation wherein the organic compound is initially in its hydrogenated form and subsequently catalytically dehydro- genated under dehydrogenation conditions in a reactor forming hydrogen and byproduct dehydrogenated organic compound, comprising:
(a) introducing the organic compound capable of reversible hydrogenation/dehydrogenation in liquid form to a microchannel reactor incorporating a dehydrogenation catalyst;
(b) vaporizing the organic compound in a vaporizer;
(c) effecting dehydrogenation of the organic compound
(d) recovering a reaction product comprised of a byproduct dehydrogenated organic
compound and gaseous hydrogen; and
(e) separating and recovering the reaction product comprised of the dehydrogenated organic compound and gaseous hydrogen into a gaseous hydrogen fraction and liquid phase byproduct dehydrogenated organic compound.

2. The process for the delivery of hydrogen from an organic compound capable of reversible hydrogenation/dehydrogenation wherein the organic compound is initially in its hydrogenated form and subsequently catalytically dehydrogenated under dehydrogenation conditions in a reactor forming hydrogen and byproduct dehydrogenated organic compound of claim 1, wherein the liquid organic material is a substituted or unsubstituted cyclic thioether having from 0 to 2 $C_{1-2}$ alkane groups as the substitutions at positions at 2,4, or 3,5 of the thiophene at a ring carbon atom.

3. The process for the delivery of hydrogen from an organic compound capable of reversible hydrogenation/dehydrogenation wherein the organic compound is initially in its hydrogenated form and subsequently catalytically dehydrogenated under dehydrogenation conditions in a reactor forming hydrogen and byproduct dehydrogenated organic compound of claim 1, wherein the dehydrogenation is carried out in a plurality of microchannel reactors wherein the pressure in each succeeding reactor is less than the prior reactor.

4. The process for the delivery of hydrogen from an organic compound capable of reversible hydrogenation/dehydrogenation wherein the organic compound is initially in its hydrogenated form and subsequently catalytically dehydrogenated under dehydrogenation conditions in a reactor forming hydrogen and byproduct dehydrogenated organic compound of claim 1, wherein the dehydrogenation is carried out in a plurality of microchannel reactors wherein the temperature in each succeeding reactor is higher than the prior reactor.

* * * * *